United States Patent

Baba et al.

(10) Patent No.: US 10,026,178 B2
(45) Date of Patent: Jul. 17, 2018

(54) METHOD OF DETERMINING NORMALITY OF IMAGING DIRECTION, AND EVALUATION DEVICE OF EVALUATING ATTACHMENT STATE OF IMAGING DEVICE

(71) Applicant: FUJITSU LIMITED, Kawasaki-shi, Kanagawa (JP)

(72) Inventors: Kozo Baba, Oita (JP); Norio Hashiguchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 14/672,565

(22) Filed: Mar. 30, 2015

(65) Prior Publication Data

US 2015/0302588 A1  Oct. 22, 2015

(30) Foreign Application Priority Data

Apr. 18, 2014  (JP) .................................. 2014-086682

(51) Int. Cl.
*H04N 5/232* (2006.01)
*G06T 7/00* (2017.01)
*G06T 7/73* (2017.01)

(52) U.S. Cl.
CPC .............. *G06T 7/0042* (2013.01); *G06T 7/73* (2017.01); *H04N 5/23229* (2013.01); *G06T 2207/10016* (2013.01); *G06T 2207/20068* (2013.01); *G06T 2207/20224* (2013.01); *G06T 2207/30244* (2013.01); *G06T 2207/30248* (2013.01)

(58) Field of Classification Search
CPC combination set(s) only.
See application file for complete search history.

(56) References Cited

U.S. PATENT DOCUMENTS

| | | | |
|---|---|---|---|
| 6,963,661 B1 | 11/2005 | Hattori et al. | |
| 6,993,159 B1 | 1/2006 | Ishii et al. | |
| 8,594,370 B2 | 11/2013 | Schamp et al. | |
| 8,687,070 B2 | 4/2014 | Chen et al. | |
| 2003/0202694 A1* | 10/2003 | Shima | G06K 9/4647 382/173 |
| 2004/0172173 A1 | 9/2004 | Goto et al. | |

(Continued)

FOREIGN PATENT DOCUMENTS

| | | |
|---|---|---|
| JP | 8-285534 | 11/1996 |
| JP | 2004-239613 | 8/2004 |

(Continued)

OTHER PUBLICATIONS

WO 2014033885 A1, Baba et al, Mar. 2014, Image Processing device, image processing method, and image processing program.*
U.S. Non-Final Office Action dated May 19, 2016 for copending U.S. Appl. No. 14/666,552, 25 pages.

(Continued)

*Primary Examiner* — Janese Duley
(74) *Attorney, Agent, or Firm* — Fujitsu Patent Center

(57) ABSTRACT

An image processing apparatus includes an acquiring unit, and determining unit. The acquiring unit acquires captured images from an imaging device mounted on a vehicle. The determining unit determines the normality of the imaging direction of the imaging device in accordance with whether an appearance pattern of a combination of a portion in which a variation is detected and a portion in which a variation is not detected among the acquired captured images corresponds to a predetermined pattern.

8 Claims, 8 Drawing Sheets

(56) References Cited

U.S. PATENT DOCUMENTS

| | | | |
|---|---|---|---|
| 2004/0201483 A1* | 10/2004 | Stam | B60Q 1/1423 |
| | | | 340/600 |
| 2009/0290809 A1 | 11/2009 | Yamada | |
| 2010/0054542 A1* | 3/2010 | Archibald | H04N 5/2351 |
| | | | 382/107 |
| 2010/0080467 A1 | 4/2010 | Sakurai | |
| 2011/0311156 A1* | 12/2011 | Seo | G06T 5/008 |
| | | | 382/266 |
| 2013/0321630 A1 | 12/2013 | Shin | |
| 2015/0154460 A1 | 6/2015 | Baba et al. | |
| 2015/0169970 A1* | 6/2015 | Baba | G06K 9/00805 |
| | | | 382/103 |
| 2015/0304650 A1 | 10/2015 | Baba et al. | |
| 2015/0304651 A1 | 10/2015 | Baba et al. | |

FOREIGN PATENT DOCUMENTS

| | | |
|---|---|---|
| JP | 2008-123036 | 5/2008 |
| JP | 2010-183294 A | 8/2010 |
| WO | 2009/001510 A1 | 12/2008 |
| WO | 2014/033936 A1 | 3/2014 |
| WO | 2014/045344 A1 | 3/2014 |

OTHER PUBLICATIONS

Japanese Office Action dated Sep. 12, 2017 for corresponding Japanese Patent Application No. 2014-086682, with English Translation, 7 pages.
Japanese Office Action dated Sep. 12, 2017 for corresponding Japanese Patent Application No. 2014-086771, with English Translation, 6 pages.
U.S. Office Action dated Sep. 15, 2017 for co-pending U.S. Appl. No. 14/662,777, 32 pages.
U.S. Office Action dated Sep. 28, 2017 for co-pending U.S. Appl. No. 14/662,552, 25 pages.
Office Action dated Jun. 12, 2017 for copending U.S. Appl. No. 14/666,552, 31 pages.
Restriction Requirement dated Apr. 4, 2017 for copending U.S. Appl. No. 14/662,777, 6 pages.
Restriction Requirement dated Jan. 17, 2017 for copending U.S. Appl. No. 14/666,552, 5 pages.
Japanese Office Action dated Nov. 21, 2017 for corresponding Japanese Application No. 2014-086526, with English Translation, 5 pages.
U.S. Office Action dated May 3, 2018 for copending U.S. Appl. No. 14/666,552, 39 pages.
U.S. Notice of Allowance dated Apr. 12, 2018 for copending U.S. Appl. No. 14/662,777, 25 pages.

* cited by examiner

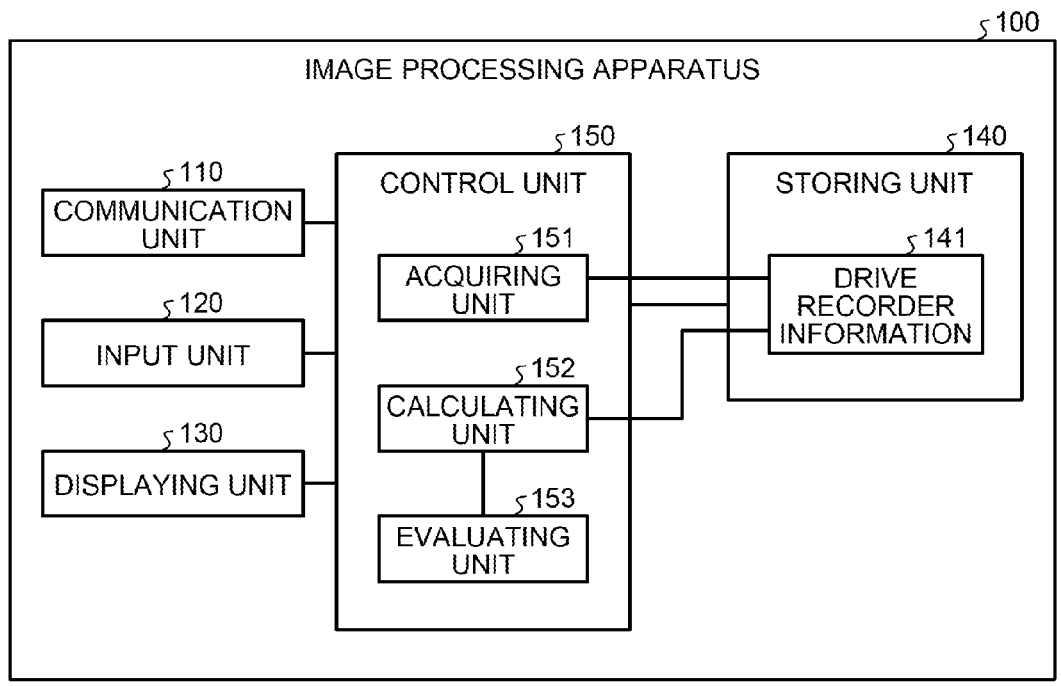

METHOD OF DETERMINING NORMALITY OF IMAGING DIRECTION, AND EVALUATION DEVICE OF EVALUATING ATTACHMENT STATE OF IMAGING DEVICE

CROSS-REFERENCE TO RELATED APPLICATION(S)

This application is based upon and claims the benefit of priority of the prior Japanese Patent Application No. 2014-086682, filed on Apr. 18, 2014, the entire contents of which are incorporated herein by reference.

FIELD

The embodiment discussed herein is related to a method of determining normality of imaging direction.

BACKGROUND

If it is possible to inform a driver of information on a potentially dangerous location where an event of a near miss, such as a vehicle accidentally contacts with a pedestrian who is crossing a road, that gives a driver a shock or a scary tends to occur, the occurrence of an accident can be prevented. Therefore, there are conventional technologies of detecting a near miss by analyzing image data recorded in a drive recorder. These related-art examples are described, for example, in Japanese Laid-open Patent Publication No. 08-285534, Japanese Laid-open Patent Publication No. 2004-239613, and Japanese Laid-open Patent Publication No. 2008-123036.

SUMMARY

According to an aspect of an embodiment, a method of determining normality of an imaging direction executed by a computer, the method including: acquiring captured images from an imaging device mounted on a vehicle; and determining the normality of the imaging direction of the imaging device in accordance with whether an appearance pattern of a combination of a portion in which a variation is detected and a portion in which a variation is not detected among the acquired captured images corresponds to a predetermined pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a functional block diagram illustrating the configuration of an image processing apparatus according to an embodiment of the present invention;

FIG. 2 is a schematic diagram illustrating an example of the data structure of drive recorder information;

DESCRIPTION OF EMBODIMENT(S)

Figure 3:
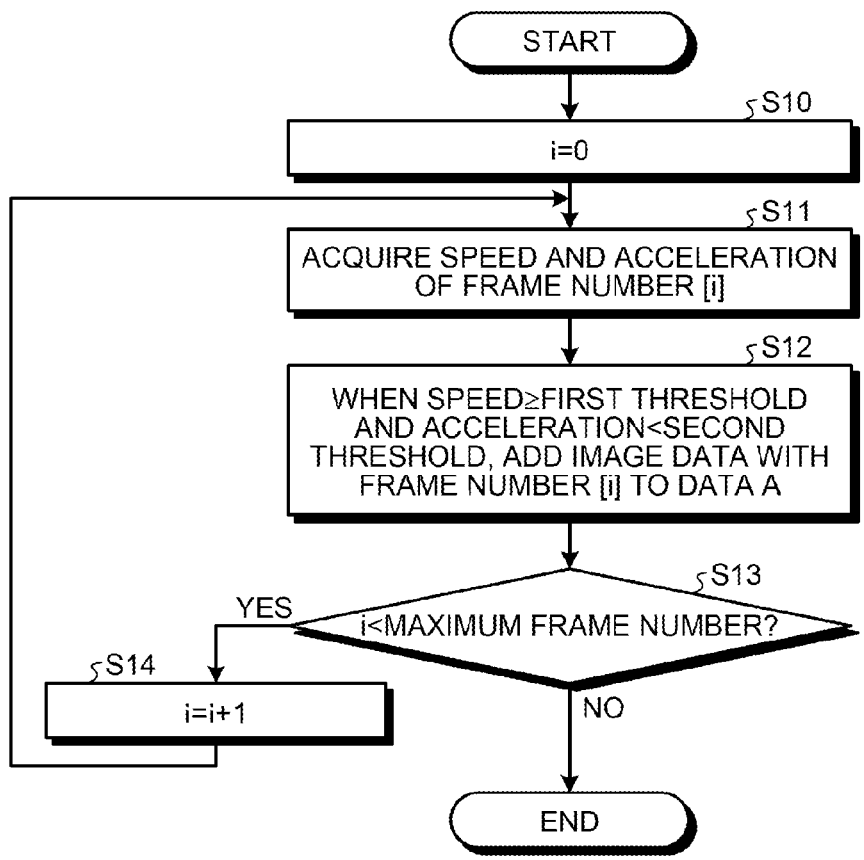
FIG. 3 is a flowchart illustrating the flow of a process of acquiring image data on an image captured by a camera during driving on a straight line.

The conventional technologies are considered on the basis of the assumption that image data corresponding to an object to be analyzed is image data captured by an imaging device that is normally arranged in a vehicle. Consequently, if an analysis is performed on image data captured by an imaging device that is not normally arranged, an effective analysis result is not obtained.

Preferred embodiments of the present invention will be explained with reference to accompanying drawings. The present invention is not limited to the embodiment.

FIG. 1 is a functional block diagram illustrating the configuration of an image processing apparatus according to an embodiment of the present invention. An image processing apparatus is an example of an imaging device attachment state evaluation device. As illustrated in FIG. 1, an image processing apparatus 100 includes a communication unit 110, an input unit 120, a displaying unit 130, a storing unit 140, and a control unit 150.

The communication unit 110 is a processing unit that performs data communication with another device via a network. For example, the communication unit 110 corresponds to a communication device or the like.

The input unit 120 is an input device that inputs various kinds of data to the image processing apparatus 100. For example, the input unit 120 corresponds to a keyboard, a mouse, a touch panel, or the like. The displaying unit 130 is a display device that displays data output from the control unit 150. For example, the displaying unit 130 corresponds to a liquid crystal display, a touch panel, or the like.

The storing unit 140 is a storing unit that stores therein drive recorder information 141. The storing unit 140 corresponds to a storage device, such as a semiconductor memory device including, for example, a random access memory (RAM), a read only memory (ROM), a flash memory, or the like.

The drive recorder information 141 includes various kinds of data recorded by a drive recorder. FIG. 2 is a schematic diagram illustrating an example of the data structure of drive recorder information. As illustrated in FIG. 2, the drive recorder information 141 stores therein, in an associated manner, a frame number, the date and time, the speed, the acceleration, the position coordinates, and an image.

The frame number is the number that is used to uniquely identify a frame. The date and time is date and time at which a subject frame is captured. The speed is a speed of a vehicle having mounted thereon a drive recorder at the time of capturing the subject frame. The acceleration is an acceleration of a vehicle having mounted thereon a drive recorder at the time of capturing the subject frame. The position coordinates are the position coordinates of a vehicle having mounted thereon a drive recorder at the time of capturing the subject frame. Furthermore, an image is image data in a subject frame.

The control unit 150 includes an acquiring unit 151, a calculating unit 152, and an evaluating unit 153. The control unit 150 corresponds to, for example, an integrated circuit, such as an application specific integrated circuit (ASIC), a field programmable gate array (FPGA), or the like. Furthermore, the control unit 150 corresponds to, for example, an electronic circuit, such as a central processing unit (CPU), a micro processing unit (MPU), or the like.

The acquiring unit 151 is a processing unit that acquires drive recorder information from a drive recorder or the like. The acquiring unit 151 registers, in the storing unit 140, drive recorder information acquired from the drive recorder or the like as the drive recorder information 141. Furthermore, the acquiring unit 151 may also sequentially acquire image data from an imaging device, such as a camera or the like, and then sequentially register the acquired image data in the drive recorder information 141.

The calculating unit 152 is a processing unit that creates, on the basis of the drive recorder information 141, a mean difference image that is the average of difference images of adjacent frames. The calculating unit 152 outputs information on the calculated mean difference image to the evaluating unit 153.

The calculating unit 152 performs a process of acquiring image data captured by a camera when a vehicle is driving on a straight line, performs a process of adding difference images, and performs a process of creating a mean difference image.

In the following, a description will be given of an example of a process in which the calculating unit 152 acquires image data captured by a camera when a vehicle is driving on a straight line. The calculating unit 152 accesses the drive recorder information 141, specifies image data in a frame in which the speed is equal to or greater than a first threshold and the acceleration is less than a second threshold, and acquires the specified image data. The image data in the frame specified by the calculating unit 152 corresponds to the image data captured by a camera during driving on a straight line.

FIG. 3 is a flowchart illustrating the flow of a process of acquiring image data on an image captured by a camera during driving on a straight line. As illustrated in FIG. 3, the calculating unit 152 sets the value of i to zero (Step S10). The calculating unit 152 acquires the speed and the acceleration of the frame number of [i] (Step S11).

If the speed is equal to or greater than the first threshold and the acceleration is less than the second threshold, the calculating unit 152 adds image data with the frame number of [i] to data A (Step S12). The calculating unit 152 determines whether the value of i is less than the maximum frame number (Step S13). If the value of i is not less than the maximum frame number (No at Step S13), the calculating unit 152 ends the process of acquiring the image data captured by the camera during the driving.

In contrast, if the value of i is less than the maximum frame number (Yes at Step S13), the calculating unit 152 updates the value of i to the value that is obtained by adding 1 to the value of i (Step S14) and then proceeds to Step S11.

In the following, a description will be given of an example of a process in which the calculating unit 152 adds a difference image. The calculating unit 152 calculates a difference image by calculating a difference between two pieces of consecutive image data stored in the data A by using the process described in FIG. 3 and then adds each of the difference images.

Figure 4:
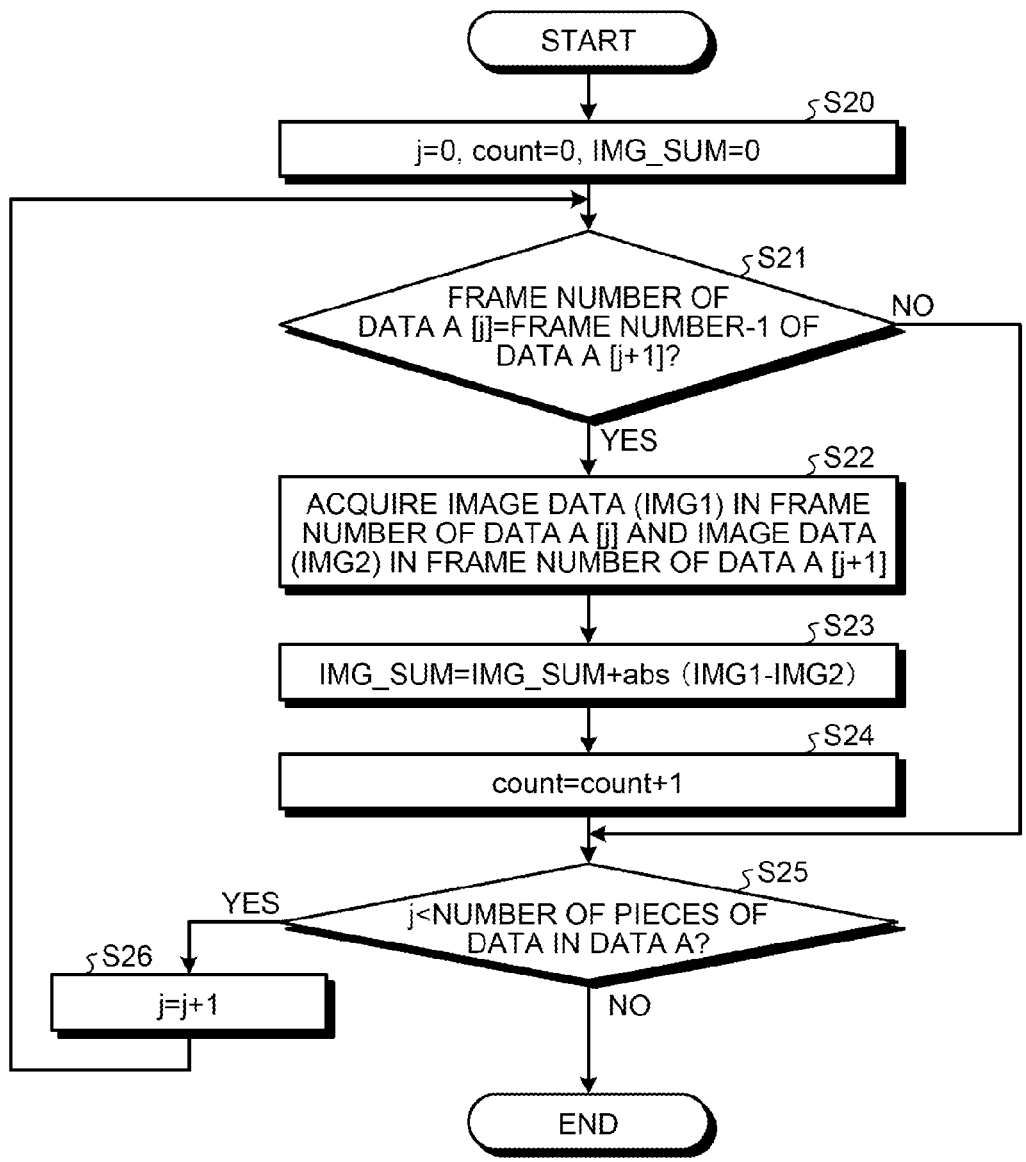
FIG. 4 is a flowchart illustrating the flow of a process of adding a difference image.

FIG. 4 is a flowchart illustrating the flow of a process of adding a difference image. As illustrated in FIG. 4, the calculating unit 152 sets the value of j to zero, sets the value of "count" to zero, and sets the value of IMG_SUM to zero (Step S20).

The calculating unit 152 determines whether the frame number of data A [j] is the same as the value that is obtained by subtracting one from the frame number of data A [j+1] (Step S21). If the frame number of data A [j] does not match the value obtained by subtracting one from the frame number of data A [j+1] (No at Step S21), the calculating unit 152 proceeds to Step S25.

In contrast, if the frame number of data A [j] matches the value obtained by subtracting one from the frame number of data A [j+1] (Yes at Step S21), the calculating unit 152 proceeds to Step S22.

The calculating unit 152 acquires image data (IMG1) in the frame number of data A[j] and image data (IMG2) in the frame number of data A [j+1] (Step S22).

The calculating unit 152 adds the absolute value "abs (IMG1-IMG2)" of the difference value between IMG1 and IMG2 to the total value "IMG_SUM" of the difference images, thereby the calculating unit 152 updates the total value "IMG_SUM" of the difference images (Step S23).

The calculating unit 152 updates the value of a "count" to the value that is obtained by adding one to the value of the "count" (Step S24). The calculating unit 152 determines whether j is less than the number of pieces of data in the data A (Step S25). If j is not less than the number of pieces of data in the data A (No at Step S25), the calculating unit 152 ends the process of adding the difference images.

If the value of j is less than the number of pieces of data in the data A (Yes at Step S25), the calculating unit 152 updates the value of j to the value obtained by adding one to the value of j (Step S26) and proceeds to Step S21.

In the following, a description will be given of a process in which the calculating unit 152 creates a mean difference image. The calculating unit 152 creates a mean difference image by dividing total value "IMG_SUM" of difference images described with reference to FIG. 4 by the value of "count" that is the number of pieces of data A. The number of pieces of the data A corresponds to the number of difference images. For example, the calculating unit 152 creates a mean difference image by calculating the mean difference image "IMG_AVE" by using Equation (1) below:

$$IMG\_AVE=IMG\_SUM/count \qquad (1)$$

The evaluating unit 153 is a processing unit that calculates a horizontal projection value of a mean difference image and that evaluates, on the basis of distribution of horizontal projection values, the attachment state of the camera. The evaluating unit 153 corresponds to a determining unit and an evaluating unit.

A description will be given of a process in which the evaluating unit 153 calculates a horizontal projection value of a mean difference image. For the location of each of the pixels in a mean difference image in the y coordinate, the evaluating unit 153 calculates a horizontal projection value by integrating the luminance in the x direction.

Figure 5:
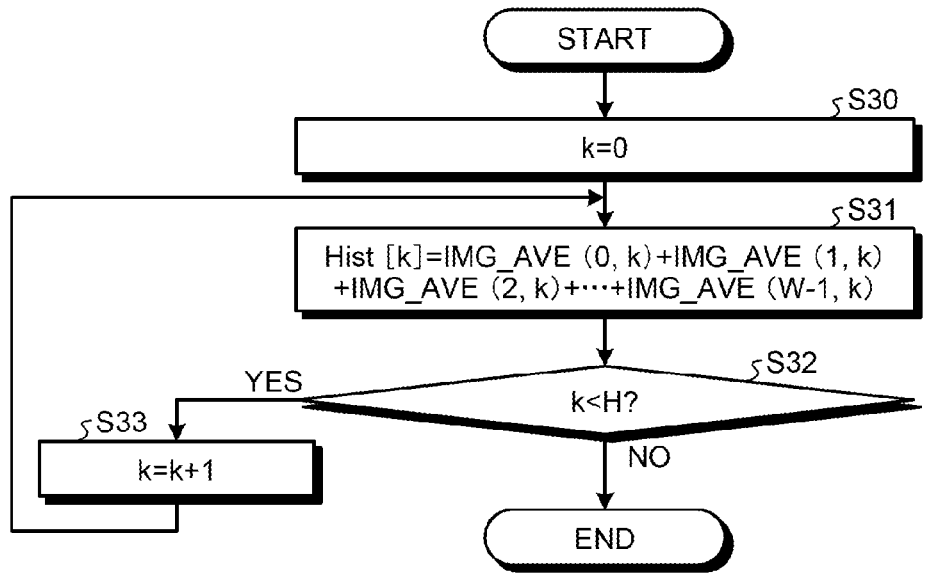
FIG. 5 is a flowchart illustrating the flow of a process of calculating a horizontal projection value of a mean difference image.

FIG. 5 is a flowchart illustrating the flow of a process of calculating a horizontal projection value of a mean difference image. As illustrated in FIG. 5, the evaluating unit 153 sets the value of k to zero (Step S30). The symbol "k" represents the location of a pixel in a mean difference image in the y coordinate and varies from 0 to H−1. The symbol "H" indicates the height of a mean difference image.

The evaluating unit 153 calculates "Hist [k]=IMG_AVE (0, k)+IMG_AVE (1, k)+ . . . +IMG_AVE (W−1, k)" (Step S31). Here, Hist [k] indicates the result obtained, at "k" in the mean difference image in the y coordinate, by adding luminance of mean difference images in the x-axis direction. Furthermore, "W" indicates the width of a mean difference image.

The evaluating unit 153 determines whether k is less than H (Step S32). If k is less than H (Yes at Step S32), the evaluating unit 153 updates the value of k to the value that is obtained by adding one to the value of k (Step S33) and proceeds to Step S31.

In contrast, if k is not less than H (No Step S32), the evaluating unit 153 ends the process of calculating a horizontal projection value of the mean difference image.

The evaluating unit 153 performs the process illustrated in FIG. 5, thereby a horizontal projection value in the mean difference image is calculated.

A description will be given of a process in which the evaluating unit 153 evaluates the attachment state of a camera on the basis of a horizontal projection value. The evaluating unit 153 performs a first evaluation process and a second evaluation process.

A description will be given of the first evaluation process performed by the evaluating unit 153. The evaluating unit 153 averages the horizontal projection values for the y coordinate and determines whether the average value of the horizontal projection values is less than a third threshold. If the average value of the horizontal projection values is less than the third threshold, the evaluating unit 153 determines that the attachment state of the camera is abnormal and then outputs the determination result.

For example, if the condition of Equation (2) is satisfied, the evaluating unit 153 determines that the attachment state of the camera is abnormal.

$$\text{Average (Hist}[0], \text{Hist}[1], \ldots, \text{Hist}[H-1]) < \text{third threshold} \quad (2)$$

If the average value of the horizontal projection values is less than the third threshold, this indicates that each piece of image data captured by the camera does not vary and thus there is a high possibility that the position at which the camera is attached is abnormal.

Figure 6:
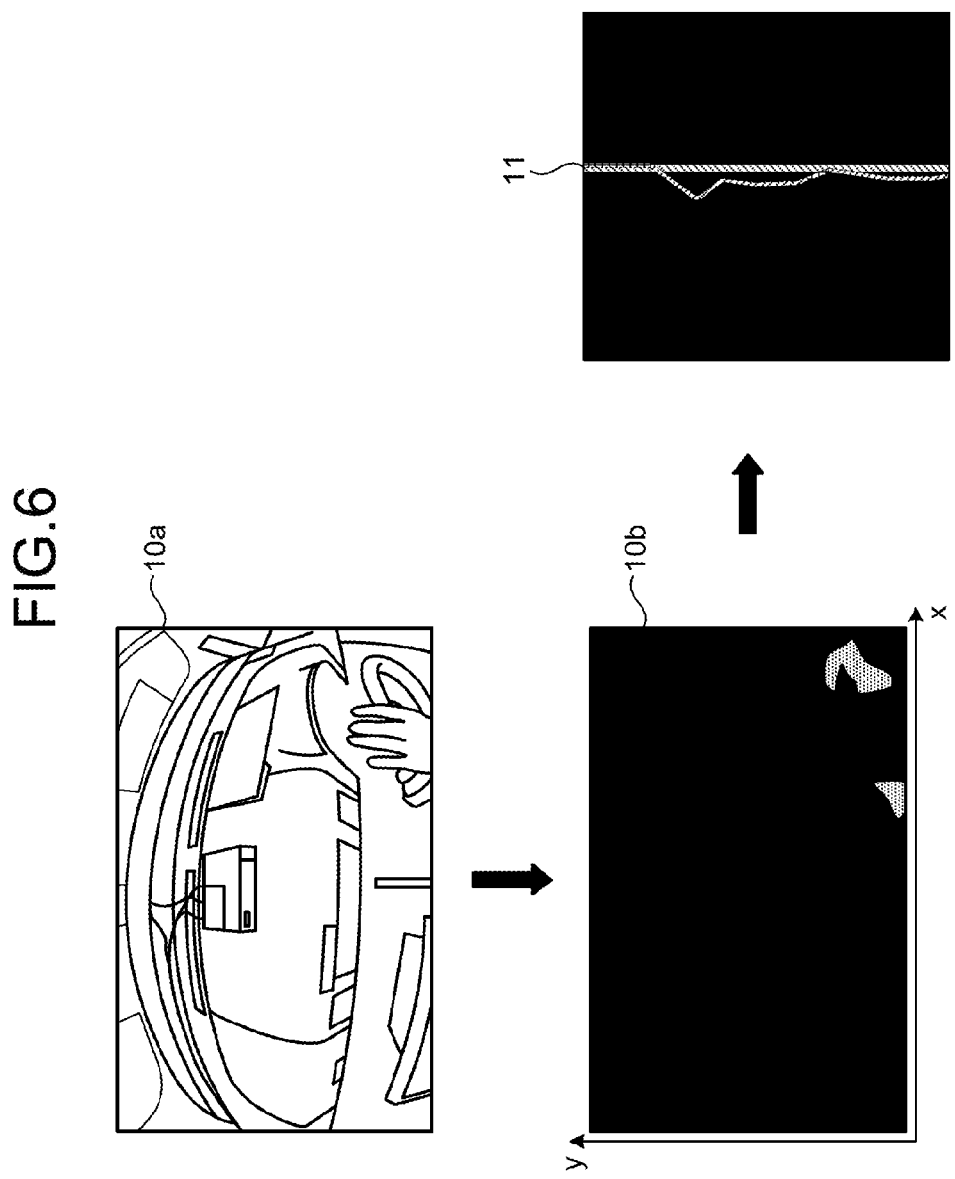
FIG. 6 is a schematic diagram (No. 1) for giving a supplementary explanation of a process performed by an evaluating unit.

FIG. 6 is a schematic diagram (No. 1) for giving a supplementary explanation of a process performed by an evaluating unit. In FIG. 6, reference numeral 10a represents image data of a certain frame number. Reference numeral 10b represents a mean difference image that is calculated from multiple pieces of image data including the image data 10a. Reference numeral 11 represents horizontal projection values calculated on the basis of the mean difference image 10b. For example, as illustrated in FIG. 6, the vertical axis of the mean difference image 10b is defined to be the y axis and the horizontal axis is defined to be the X-axis. For each of the positions of the pixels in the y coordinate, the evaluating unit 153 calculates the horizontal projection values 11 by performing additions of luminance in the x-axis direction. If the average value of the horizontal projection values 11 is less than the third threshold, the evaluating unit 153 determines that the attachment state of the camera is abnormal.

Furthermore, when the evaluating unit 153 calculates the average value of the horizontal projection values 11, the evaluating unit 153 calculates the average value of the values between Hist [0] and Hist [H−1]; however, the calculation is not limited thereto. For example, the evaluating unit 153 may also calculate the average value of the horizontal projection values near the center and then compare the value with the third threshold. In this way, by limiting the area that is used to calculate the average value of the horizontal projection values, an amount of calculation can be reduced.

A description will be given of the second evaluation process performed by the evaluating unit 153. The evaluating unit 153 compares a value at the lower portion of the horizontal projection value with a value at the upper portion of the horizontal projection value. If the value at the upper portion of the horizontal projection value is greater than the value at the lower portion of the horizontal projection value, the evaluating unit 153 determines that the attachment state of the camera is abnormal and outputs the determination result.

For example, If the conditions of Equation (3) and Equation (4) are satisfied, the evaluating unit 153 determines that the attachment state of the camera is abnormal. A value smaller than that of "H/2" is set for "N" in Equations (3) and (4). For example, Average (Hist [0], . . . , Hist [N]) is the average value of the values at the lower portion of the horizontal projection value. Average (Hist [H−1−N], . . . , Hist [H−1]) is the average value of the values at the upper portion of the horizontal projection value.

$$\text{Average (Hist}[0], \ldots, \text{Hist}[N]) < \text{fourth threshold} \quad (3)$$

$$\text{Average (Hist}[0], \ldots, \text{Hist}[N]) + \text{fifth threshold} < \text{Average (Hist}[H-1-N], \ldots, \text{Hist}[H-1]) \quad (4)$$

If the conditions of Equations (3) and (4) are satisfied, this indicates that a variation is great in the upper portion of the screen data captured by a camera and a variation is small in the lower portion of the screen data. This feature is an inverse of the feature of the image data captured by a camera that is normally attached. In the image data captured by a camera that is normally attached, because a variation in screen data in the lower portion in which another vehicle or the like is included becomes great, for a horizontal projection value, the value of the lower portion is greater than that of the upper portion.

Figure 7:
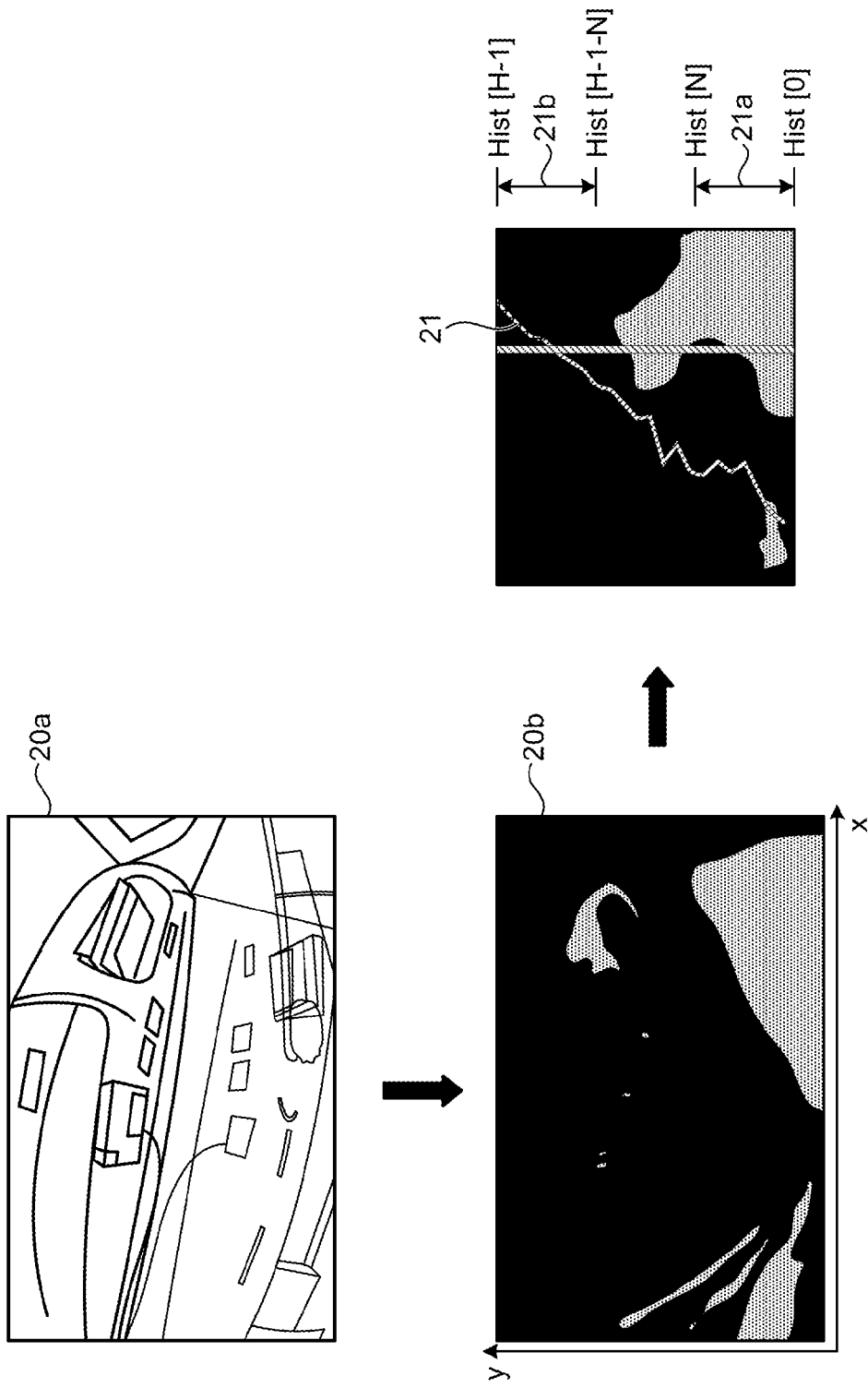
FIG. 7 is a schematic diagram (No. 2) for giving a supplementary explanation of a process performed by the evaluating unit.

FIG. 7 is a schematic diagram (No. 2) for giving a supplementary explanation of a process performed by the evaluating unit. In FIG. 7, reference numeral 20a represents image data with a certain frame number. Reference numeral 20b represents a mean difference image calculated from multiple pieces of image data including the image data 20a. Reference numeral 21 represents the horizontal projection values calculated on the basis of the mean difference image 20b. For example, as illustrated in FIG. 7, the vertical axis of the mean difference image 20b is defined to be the y-axis and the horizontal axis of the mean difference image 20b is defined to be the X-axis. For each of the positions of the pixels in the y coordinate, the evaluating unit 153 calculates the horizontal projection values 21 by performing additions of luminance in the x-axis direction.

Furthermore, in FIG. 7, reference numeral 21a is defined to be the lower portion of the horizontal projection values and reference numeral 21b is defined to be the upper portion of the horizontal projection values. For example, if the relationship between the lower portion 21a of the horizontal projection values and the upper portion 21b of the horizontal projection values satisfies the conditions of Equations (3) and (4), the evaluating unit 153 determines that the attachment state of a camera is abnormal.

Figure 8:
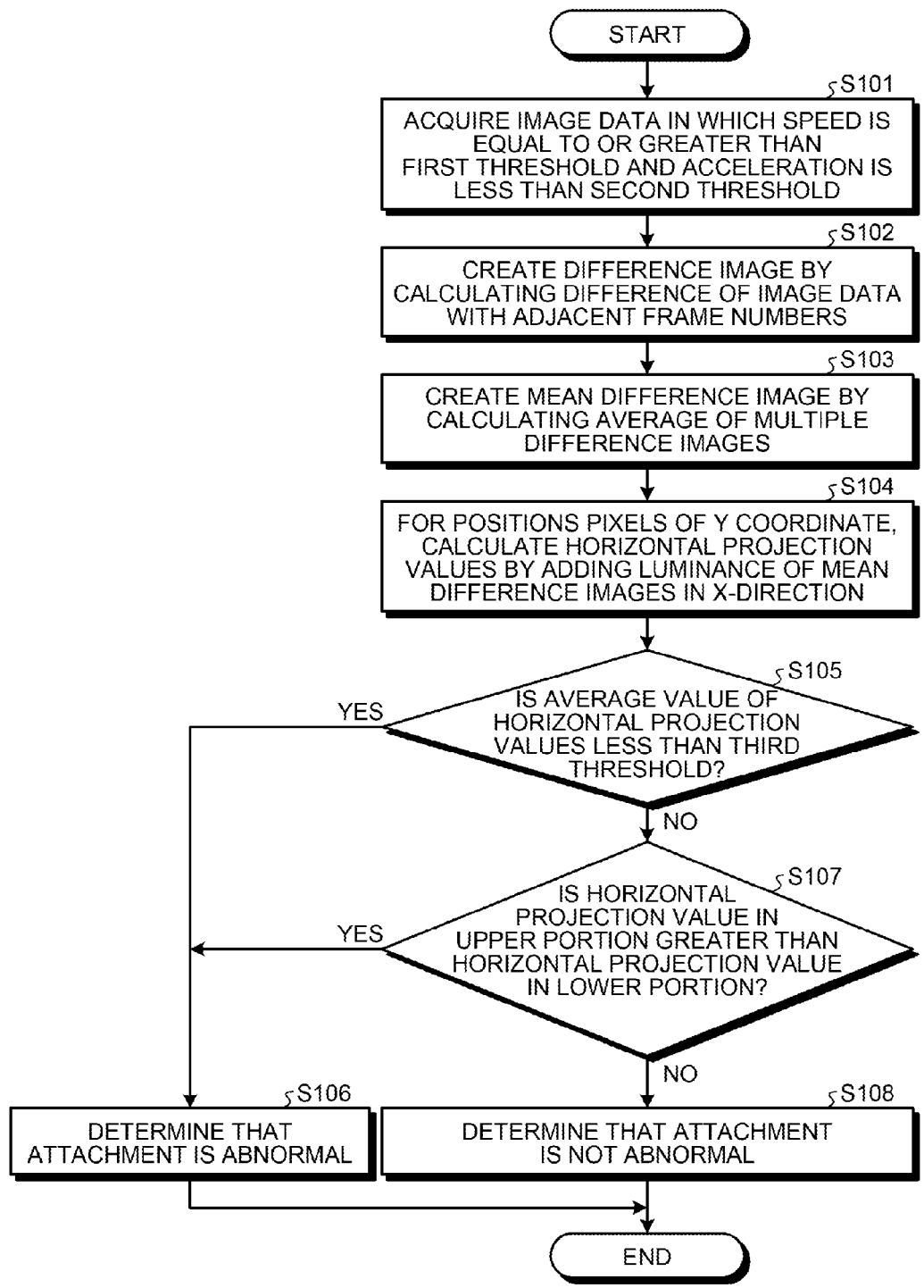
FIG. 8 is a flowchart illustrating the flow of a process performed by the image processing apparatus according to the embodiment.

In the following, the flow of a process performed by the image processing apparatus 100 according to the embodiment will be described. FIG. 8 is a flowchart illustrating the flow of a process performed by the image processing apparatus according to the embodiment. As illustrated in FIG. 8, the image processing apparatus 100 acquires image data in which the speed is equal to or greater than the first threshold and the acceleration is less than the second threshold (Step S101).

By calculating the difference of the image data with adjacent frame numbers, the calculating unit 152 in the image processing apparatus 100 creates a difference image (Step S102). By calculating the average of multiple difference images, the calculating unit 152 creates a mean difference image (Step S103).

For the position of each of the pixels in the y coordinate, the evaluating unit 153 in the image processing apparatus 100 calculates the horizontal projection values by adding the luminance of the mean difference images in the x direction (Step S104). The evaluating unit 153 determines whether the average value of the horizontal projection values is less than the third threshold (Step S105).

If the average value of the horizontal projection values is less than the third threshold (Yes at Step S105), the evaluating unit 153 determines that the attachment is abnormal (Step S106).

In contrast, if the average value of the horizontal projection values is not less than the third threshold (No at Step S105), the evaluating unit 153 determines whether the horizontal projection values in the upper portion are greater than the horizontal projection values in the lower portion (Step S107). If the horizontal projection values in the upper portion are greater than the horizontal projection values in the lower portion (Yes at Step S107), the evaluating unit 153 proceeds to Step S106.

In contrast, if the horizontal projection values in the upper portion are not greater than the horizontal projection values in the lower portion (No at Step S107), the evaluating unit 153 determines that the attachment is not abnormal (Step S108).

In the following, the effect of the image processing apparatus 100 according to the embodiment will be described. The image processing apparatus 100 determines the normality of the imaging direction of the camera in accordance with whether the appearance pattern of a combination of a portion in which a variation is detected and a portion in which a variation is not detected correspond to a predetermined pattern. Therefore, it is possible to accurately determine whether the imaging direction of a camera is normal.

For the positions of pixels at the y coordinate, by integrating the luminance of the mean difference image in the x direction, the image processing apparatus 100 calculates horizontal projection values and evaluates the attachment state of the camera on the basis of the distribution of these horizontal projection values. Therefore, it is possible to accurately determine whether the imaging direction of a camera is normal.

The image processing apparatus 100 evaluates the attachment state of a camera on the basis of the distribution of the horizontal projection values in an area at the end side. Therefore, by narrowing down the area in which integrated values are evaluated, it is possible to reduce the calculation targets and thus the processing load can be reduced. Furthermore, the distribution in the vicinity of the center of the horizontal projection values varies when compared with the area at the end side regardless of whether the camera is normally attached. Therefore, by using the portion on the end sides, it is possible to more accurately determine whether the imaging direction of the camera is appropriate.

When the image processing apparatus 100 calculates the average value of the horizontal projection values near the center, compares the average value with the third threshold, and evaluates the normality of the imaging direction of the camera, the image processing apparatus 100 can limit the area that is used to obtain the average value of the horizontal projection values and thus the calculation amount can be reduced.

With the example in the embodiment described above, the attachment state of a camera is analyzed by acquiring the drive recorder information 141 from a drive recorder and then analyzing the drive recorder information 141; however, the method is not limited thereto. For example, the image processing apparatus 100 may also be embedded in a drive recorder, image data may also be acquired from a camera in real time, the normality of the camera in an imaging direction may also be determined, and the determination result may also be sent to a driver as a notification.

Furthermore, in the embodiment, a description of the process has been given by using the first to the fifth thresholds; however, a user may also appropriately change the value of each of the first to the fifth thresholds.

Figure 9:
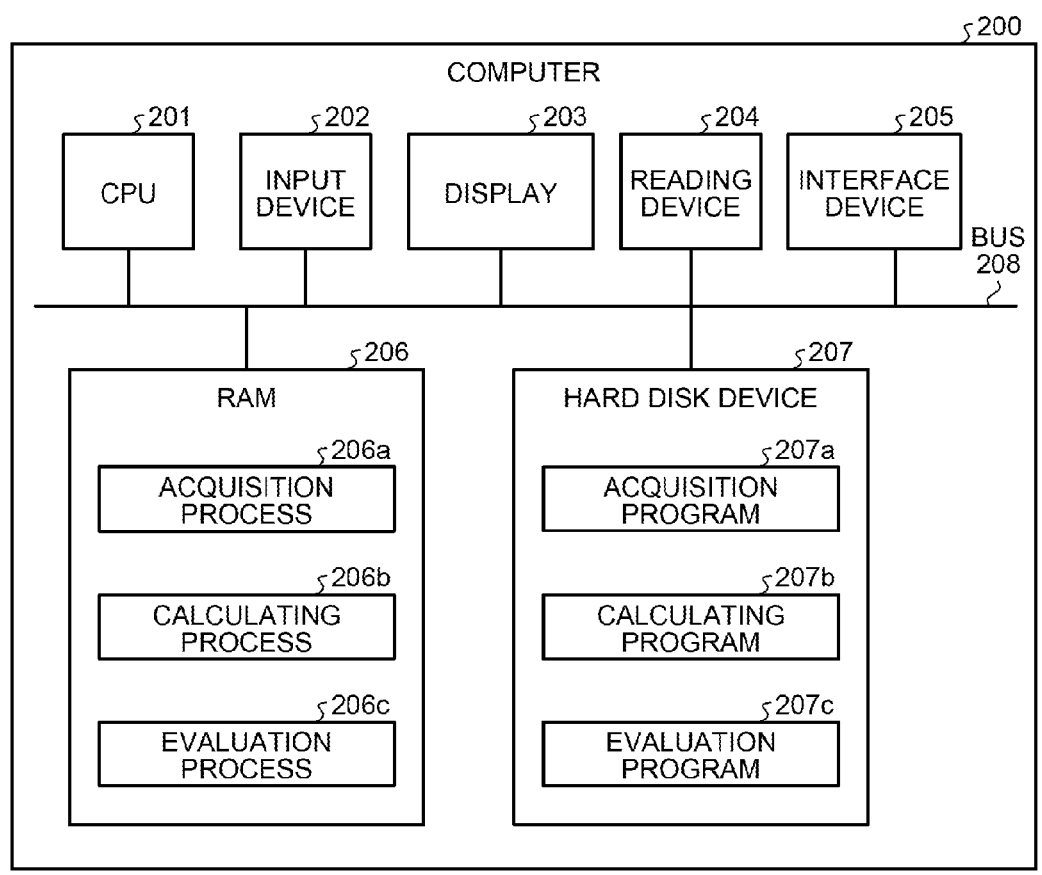
FIG. 9 is a block diagram illustrating an example of a computer that executes an imaging device attachment state evaluation program.

In the following, a description will be given of an example of a computer that executes an imaging device attachment state evaluation program that implements the same function as that performed by the image processing apparatus 100 in the embodiment described above. FIG. 9 is a block diagram illustrating an example of a computer that executes an imaging device attachment state evaluation program.

As illustrated in FIG. 9, a computer 200 includes a CPU 201 that executes various arithmetic processing, an input device 202 that receives an input of data from a user, and a display 203. Furthermore, the computer 200 includes a reading device 204 that reads a program or the like from a storage medium and an interface device 205 that exchanges data with another computer via a network. Furthermore, the computer 200 includes a RAM 206 and a hard disk device 207 that temporarily store therein various kinds of information. Then, each of the devices 201 to 207 is connected to a bus 208.

The hard disk device 207 includes an acquisition program 207a, a calculating program 207b, and an evaluation program 207c. The CPU 201 reads the acquisition program 207a, the calculating program 207b, and the evaluation program 207c and loads the programs in the RAM 206. The acquisition program 207a functions as an acquisition process 206a. The calculating program 207b functions as a calculating process 206b. The evaluation program 207c functions as an evaluation process 206c.

For example, the acquisition process 206a corresponds to the acquiring unit 151. The calculating process 206b corresponds to the calculating unit 152. The evaluation process 206c corresponds to the evaluating unit 153.

Furthermore, the acquisition program 207a, the calculating program 207b, and the evaluation program 207c do not need to be stored in the hard disk device 207 from the beginning. For example, the programs are stored in a "portable physical medium", such as a flexible disk (FD), a CD-ROM, a DVD disk, a magneto-optic disk, an IC CARD, or the like that is to be inserted into the computer 200. Then, the computer 200 may also read and execute the acquisition program 207a, the calculating program 207b, and the evaluation program 207c from the portable physical medium.

According to an aspect of an embodiment of the present invention, an advantage is provided in that the normality of an imaging direction of an imaging device can be evaluated.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of determining normality of an imaging direction executed by a computer, the method comprising:
   acquiring from an imaging device attached to a vehicle, image data in each of a plurality of frames in each of which a reference direction is defined, when a speed of the vehicle is equal to or greater than a first threshold and an acceleration of the vehicle is less than a second threshold;
   calculating, for each area of the image data in the reference direction, an index related to an amount of a difference between the frames of the image data; and
   evaluating an attachment state of the imaging device on a basis of distribution of the indices related to the amount of the difference in the reference direction
   wherein the index related to the amount of the difference is the amount of the difference of luminance between the frames of the image data, and
   the evaluating creates, for a position of each of a plurality of pixels in the reference direction, distribution of integrated values of luminance of the pixels arrayed in a direction intersecting the reference direction,
   determines the attachment state of the imaging device is abnormal when an upper position of the distribution is greater than a lower position of the distribution and determines the attachment state of the imaging device is normal when the upper position of the distribution is not greater than the lower position of the distribution.

2. The method of determining normality of the imaging direction according to claim 1, wherein the acquiring acquires sequentially captured images from the imaging device mounted on the vehicle.

3. A non-transitory computer-readable recording medium storing a program that causes a computer to execute a process comprising:
   acquiring, from an imaging device attached to a vehicle, image data in each of a plurality of frames in each of which a reference direction is defined, when a speed of the vehicle is equal to or greater than a first threshold and an acceleration of the vehicle is less than a second threshold;
   calculating, for each area of the image data in the reference direction, an index related to an amount of a difference between the frames of the image data; and
   evaluating an attachment state of the imaging device on a basis of distribution of the indices related to the amount of the difference in the reference direction
   wherein the index related to the amount of the difference is the amount of the difference of luminance between the frames of the image data, and
   the evaluating creates, for a position of each of a plurality of pixels in the reference direction, distribution of integrated values of luminance of the pixels arrayed in a direction intersecting the reference direction,
   determines the attachment state of the imaging device is abnormal when an upper position of the distribution is greater than a lower position of the distribution and determines the attachment state of the imaging device is normal when the upper position of the distribution is not greater than the lower position of the distribution.

4. The non-transitory computer-readable recording medium according to claim 3, wherein the evaluating evaluates the attachment state of the imaging device on the basis of the distribution of the indices related to the amount of the difference in an area on an end side in a direction intersecting the reference direction from among the areas of the image data.

5. The non-transitory computer-readable recording medium according to claim 3, wherein the evaluating evaluates the attachment state of the imaging device on the basis of the distribution of the indices related to the amount of the difference in an area at a midpoint portion in a direction intersecting the reference direction from among the areas of the image data.

6. An evaluation device of evaluating attachment state of an imaging device attached to a vehicle comprising a processor configured to:
   acquire, from the imaging device, image data in each of a plurality of frames in each of which a reference direction is defined, when a speed of the vehicle is equal to or greater than a first threshold and an acceleration of the vehicle is less than a second threshold;
   calculate, for each area of the image data in the reference direction, an index related to an amount of a difference between the frames of the image data; and
   evaluate an attachment state of the imaging device on a basis of distribution of the indices related to the amount of the difference in the reference direction
   wherein the index related to the amount of the difference is the amount of the difference of luminance between the frames of the image data, and the processor further configured to, for a position of each a plurality of pixels in the reference direction, create distribution of integrated values of luminance of the pixels arrayed in a direction intersecting the reference direction
   determine the attachment state of the imaging device is abnormal when an upper position of the distribution is greater than a lower position of the distribution and determine the attachment state of the imaging device is normal when the upper position of the distribution is not greater than the lower position of the distribution.

7. The evaluation device according to claim 6, wherein the processor further configured to evaluate the attachment state of the imaging device on the basis of the distribution of the indices related to the amount of the difference in an area on an end side in a direction intersecting the reference direction from among the areas of the image data.

8. The evaluation device according to claim 6, wherein the processor further configured to evaluate the attachment state of the imaging device on the basis of the distribution of the indices related to the amount of the difference in an area at a midpoint portion in a direction intersecting the reference direction from among the areas of the image data.

* * * * *